United States Patent [19]

Morgan et al.

[11] 4,293,527
[45] Oct. 6, 1981

[54] METALS EXTRACTION FROM SEA WATER

[75] Inventors: Dean T. Morgan, Sudbury; Chryssostomos Chryssostomidis, Cambridge; George J. LaRue, Wayland, all of Mass.

[73] Assignee: Thermo Electron Corporation, Waltham, Mass.

[21] Appl. No.: 149,866

[22] Filed: May 14, 1980

[51] Int. Cl.$^3$ .............................................. C02F 1/28
[52] U.S. Cl. ........................................ 423/6; 210/675; 210/682; 210/170; 210/241
[58] Field of Search .............. 210/670, 675, 682, 684, 210/170, 190, 387, 236, 241; 423/6, 7; 521/26

[56] References Cited

U.S. PATENT DOCUMENTS

| 3,721,533 | 3/1973 | Riedel | 23/337 |
| 3,763,049 | 10/1973 | Gerber | 423/7 |
| 4,039,445 | 8/1977 | Heide et al. | 423/6 |
| 4,134,831 | 1/1979 | Dawson et al. | 210/682 |

OTHER PUBLICATIONS

Llewelyn, G. I. W., "Recovery of Uranium from Seawater", Proceedings of an Advisory Group on Uranium Ore Processing, IAEA-AG/33-12, Vienna, 1976, pp. 205-212.

Bettinoli et al., "Uranium from Sea-Water: Possibilities of Recovery Exploiting Slow Coastal Currents", Proceedings of an Advisory Group on Uranium Ore Processing, IAEA-AG/33-4, Vienna, 1976, pp. 213-231.

Harrington, F. E., "Cost Commentary on a Proposed Method for Recovery of Uranium from Seawater", ORNL-TM-4757, Oak Ridge Nat. Lab., Nov. 1974, pp. 2-4, 15-25, 37 & 51.

Campbell et al., "Extraction of Uranium from Seawater: Chemical Process and Plant Design Feasibility Study", vol. I, XN-RT-15, Feb. 1979, pp. 3-4, 31-33 & 40-46.

Primary Examiner—Ivars C. Cintins
Attorney, Agent, or Firm—Herbert E. Messenger; James L. Neal

[57] ABSTRACT

A method and system for continuously extracting metals from sea water by deploying adsorber sheets in a suitable current of sea water, recovering the adsorber sheets after they become loaded with metal and eluting the metal from the recovered sheets. The system involves the use of hollow, perforated bobbins on which the sheets are rolled as they are recovered and through which elutant is introduced.

14 Claims, 7 Drawing Figures

METALS EXTRACTION FROM SEA WATER

BACKGROUND OF THE INVENTION

This invention relates in general to the extraction of metals from sea water and in particular to a system and method for the continuous extraction of uranium utilizing flexible adsorber sheets which are first deployed in currents of sea water for adsorption of a metal and then recovered for elution of that metal.

The recovery of metals generally from sea water is by no means a novel subject but the costs associated with most techniques have rendered them impractical. It was early recognized that enormous quantities of sea water would be needed for any practical production and that the siting of the extraction facility would have to be carefully chosen to ensure an adequate inflow of fresh sea water and the avoidance of recirculation of depleted sea water through the facility.

Various approaches have been considered. Studies of oceanographic data have indicated that in certain areas of the world a fairly constant current is available to meet certain of the criteria for a practical facility. Tidal schemes have also been proposed where a large area of water may be enclosed in a lagoon for extraction of metals followed by a tidal discharge of the depleted water and tidal refilling of the lagoon. Also, several pumped-water schemes have been proposed. However, a broad range of problems including large capital and operating costs, environmental aspects, energy requirements, availability and characteristics of proposed sites and even political factors have prevented the realization of any of the proposals. It is a major object of this invention to avoid or overcome the problems associated with previous proposals and to provide a practical system and facility for the continuous extraction of metals from sea water.

SUMMARY OF THE INVENTION

Although the extraction of various metals from the ocean is contemplated, the present invention will be described in connection with uranium as a typical metal to which the extraction system and method are applicable.

The world's oceans contain dissolved uranium in the form of the uranyl carbonate ion $[UO_2(CO_3)_3]^{-4}$ in generally uniform concentration of about 3 parts per billion. While this concentration is rather low, the total uranium contained in oceans is enormous and much greater than the economically recoverable land-based resources. The limited nature of land-based resources and the increasing use of uranium in nuclear reactors have awakened renewed interest in the oceans as a source of uranium.

The extraction facility would preferably be on a platform located relatively closely off the shore of the United States with adsorption of uranium to take place on horizontal adsorber sheets floating and stationary in a relatively high-velocity warm current of sea water. The adsorber sheets are made of screen or fabric coated with micron-size adsorber particles and the sheets are continuously deployed and recovered by a conveyer-track system. The sheets are wound on hollow perforated bobbins at the recovery stage and uranium is eluted from the wound adsorber sheets by a flow of elutant from the hollow core of the bobbin uniformly out through the rolled adsorber sheet.

The loaded elutant may be stored in a tank in the platform and periodically the contents of the tank may be transported to an onshore plant for recovery of uranium from the elutant. The elutant from which the uranium has been stripped may then be recycled for further use.

Obviously, for each of the other metals to be extracted, in each case, a specific adsorber and a specific elutant would be chosen.

For a better understanding of the present invention together with other and further objects, features and advantages, reference should be made to the following detailed description of a preferred embodiment of the invention which should be read with reference to the accompanying drawing, in which:

DESCRIPTION OF THE PREFERRED EMBODIMENT

An exhaustive study of oceanographic data indicates that the optimum site in the world for mining metals from sea currents lies off the southeastern Florida coast in the Florida current. Specifically, the flow channel created by the Florida Keys and coast on one side and Cuba and the Bahamas on the other constitutes one of the largest rivers in the world. For example, at a point just south of Miami between Fowey Rocks and Gun Cay, the current is typically in excess of 3 knots at the surface and is in excess of 2 knots to a depth of about 500 feet. Recovery of only a small fraction of the total metals carried by the Florida current would be economically advantageous and recovery of a fraction of uranium alone would provide 100 percent of the uranium required in the U.S. for hundreds of years even with future major utilization of nuclear power. Moreover, insofar as the availability of undepleted sea water is concerned, studies indicate that about half of the volume of the Florida current is derived from the Atlantic Ocean in a circulation pattern which involves waters moving south off the western coast of Africa and forming the north equatorial current. The other half of the Florida current comes from the Guiana current moving from south of the equator and the south equatorial current moving along the eastern coast of South America. Thus, the Florida current comes from well-mixed ocean waters and will serve as a source of metals including uranium for many hundreds of years. Moreover, the sea water in the Florida current is of warm temperature year round, ranging from 24° C. in winter to about 29° C. in summer. With such temperatures, efficient metals extraction by the methods of the present invention is assured year-round.

Figure 1:
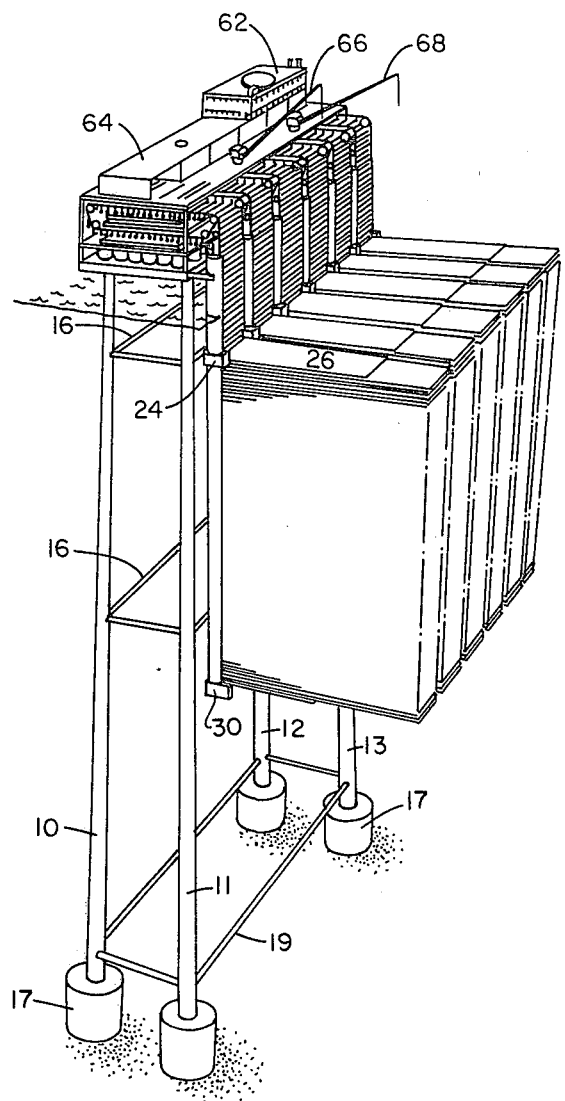
FIG. 1 is a perspective view of an offshore facility for extracting uranium from sea water.
Figure 2:
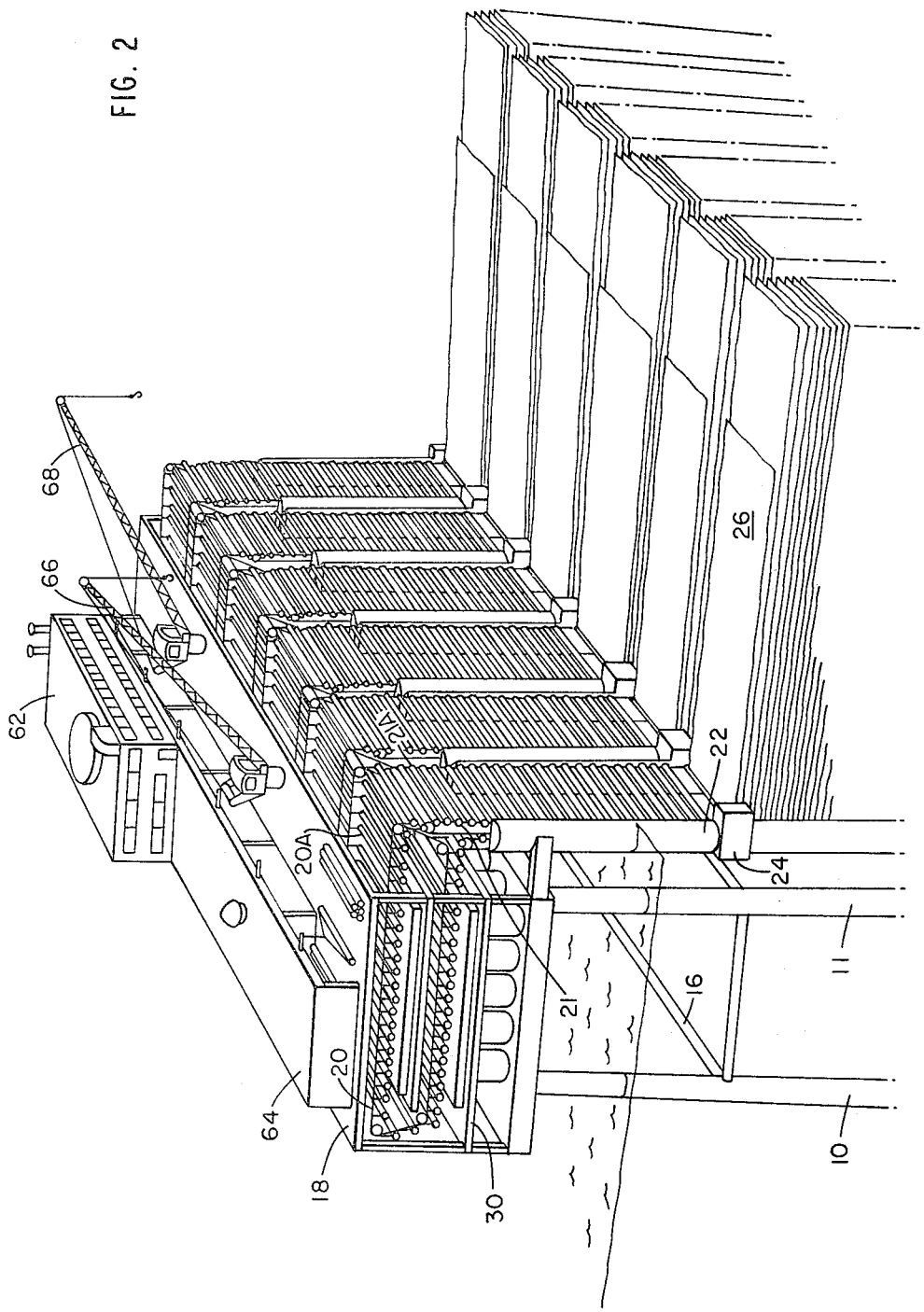
FIG. 2 is an enlarged view of a portion of the uranium extraction facility shown in FIG. 1.

In FIGS. 1 and 2, a multi-level platform preferably sited in the Florida current is shown. The basic platform structure may be generally similar to those platforms used in offshore oil well drilling having platform decks of the order of 300 ft. by 100 ft.

The legs 10, 11, 12, and 13, which may be interconnected by cross-braces such as those shown at 16 and 19, extend to the ocean bottom where they are encased in concrete footings 17 or other suitable anchoring members to provide stable support for the platform. Alternatively, a platform of the semisubmerisible type may be used.

Beneath a top deck 18 of the platform a conveyer 20 is illustrated. The conveyer 20 operates synchronously with a similar conveyor 20a, and perforated bobbins on which adsorber sheets are wound are carried by opposing elements of the conveyors 20 and 20a. Although a total sheet width of about 240 feet is contemplated, the width of the sheet segment between the conveyers 20 and 20a is approximately 40 feet, as are the other sheet segments. The hollow perforated bobbins are preferably of corrosion-resistant steel tubing and may be about 50 feet in length and about 4 inches in outer diameter. The sheets wound on the bobbins may, for example, be about 200 feet long.

The operation of the two conveyers is identical and the description will be limited to the conveyer 20. Wound upon the bobbins suspended from the conveyer are a plurality of adsorber sheets. The adsorber sheets may be composed of screen or fabric which is coated with micron-size adsorber particles, as is explained in greater detail below.

Figure 3:
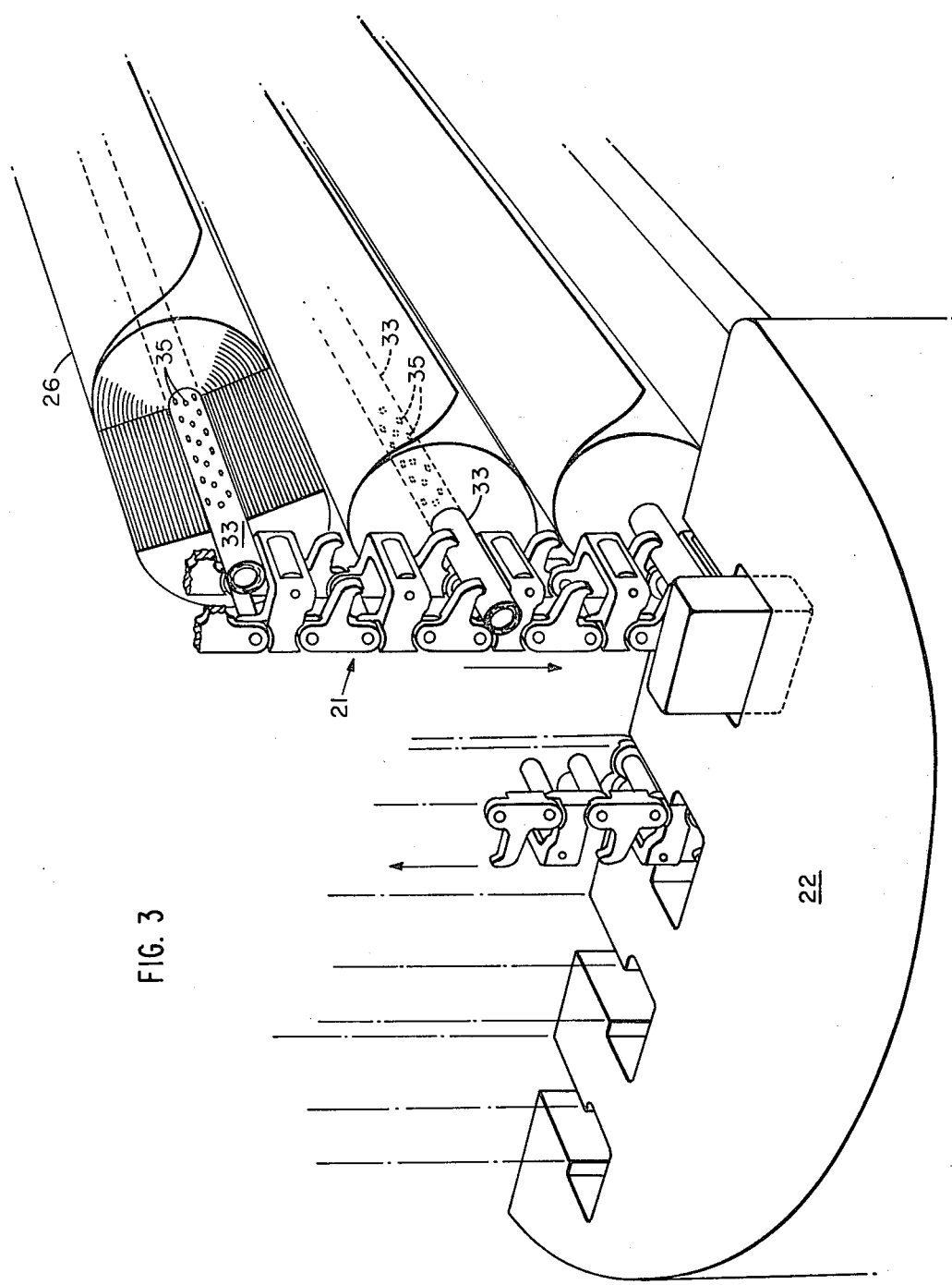
FIG. 3 is a perspective view, partially broken away to expose internal details of a portion of a conveyor for vertically transporting bobbins and adsorber sheets.

At the right-hand end of the conveyer 20 the adsorber sheets on the bobbins, having been stripped of adsorbed material and cleaned, are transferred to a second vertically operating conveyer 21 on which they are carried downwardly at relatively high speed. The conveyer 21 may be enclosed in a tube 22 which is slotted to permit engagement of the end of the bobbin by the conveyer 21. Similar structure is provided for a cooperating conveyer 21a. A typical vertically operating conveyer 21 is illustrated in FIG. 3, which also shows a cutaway view of hollow tubular bobbins 33 and the rolled sheets 26 carried thereby. The bobbins 33 include perforations 35 useful in connection with elution of uranium, as is explained in greater detail below.

The bobbins and the adsorber sheets are carried by the second conveyer 21 to a point which may be 20 ft. below the surface of the sea to avoid surface wave action. At that point, a deployment motor 24 spins each bobbin to unroll a sheet such as the sheet 26 from the bobbin. The adsorber sheets are of sufficient density to be approximately neutrally buoyant and they tend to float and stream out in the current of sea water. Each bobbin is then transferred to a third conveyer 27, not visible in FIGS. 1 and 2 but shown in FIG. 4, which may carry the fully deployed sheets downwardly for a predetermined distance—for example, approximately 400 ft. The downward transport is effected at a relatively slow speed so that the sheets are nearly fully loaded with uranium when they reach the end of the 400-foot downward travel. The sheets may be spaced apart typically by a distance of 12 to 24 inches.

Figure 4:
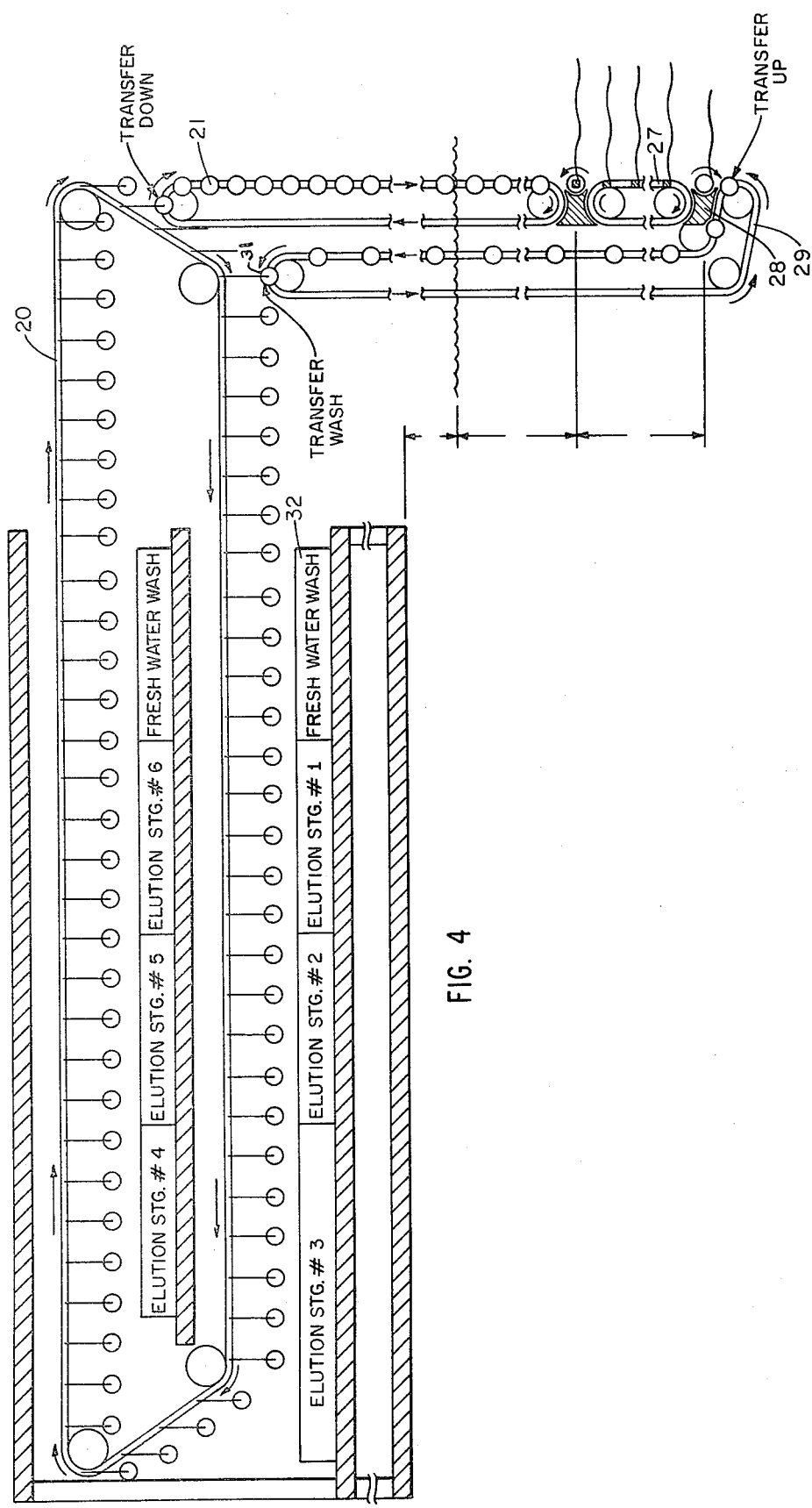
FIG. 4 is a schematic view of the conveyor systems, the deployment and recovery mechanisms and the elution stages.

At the end of the 400-ft. downward travel on the conveyer 27, which travel may take as long as 4 to 5 hours or longer, the sheets reach a rewind station 28 where the sheets are rewound on the bobbins into rolls by a rewind motor 30. The rolls are there transferred to a fourth conveyer 29, on which they are relatively rapidly carried upwardly to a point 31 above the surface of the water where they are returned to the conveyer 20. The rolls are carried horizontally to the left by the conveyer 20 as shown in FIG. 4 to a fresh-water station 32. At this point, flow connectors are connected to the ends of the bobbins and fresh water is introduced through the hollow centers of the perforated bobbins to flush sea water from the rolls. The flushing action may be enhanced by rotating the bobbins at high speed to cause the fresh water to be forced outwardly through the bobbins and rolls by centrifugal forces. The high speed rotation may also be employed prior to flushing to remove excess sea water from the rolls. Both centrifuging steps assist in minimizing the volume of fresh water required for flushing.

After the water flush, bobbins and rolls are carried to a series of elution stages. Flow connectors again engage the bobbin ends and elution is carried out by introducing 1 M ammonium carbonate solution through the hollow core of the bobbins to pass outwardly through the perforations and the rolled adsorber sheets. Again, the bobbins and rolls may be centrifuged at each stage by rotating the bobbins at high speed. Other elutants such as sodium carbonate or dilute hydrochloric acid may be used as alternatives to ammonium carbonate.

The preferred method of carrying out the elution process is a counter-current continuous operation in which fresh ammonium carbonate solution is introduced at the final elution stage #6, at which point most of the uranium has been extracted from the rolled sheets. The loaded elutant derived from the rolls at elution stage #6 is then pumped to elution stage #5 where the elution is repeated. Again, the loaded elutant from elution stage #5 is then pumped to elution stage #4, the elution being repeated at each elution stage until elution stage #1 is reached. At each stage the concentration of uranium in the elutant increases. Sheets at stage #1 have the maximum loading of uranium as has the elutant. The final concentrated elutant products from stage #1 may be stored for removal to an onshore facility. The sheets leaving elution stage #6 are drained and centrifuged for maximum elutant removal followed by a fresh water wash before they are recycled into the sea.

To minimize blockage of the current of sea water by the bobbins and rolled sheets carried by the conveyors 21 and 29, the bobbin spacings and the speeds of these conveyors must be properly selected relative to those of the conveyor 27. For example, as shown in FIG. 4 (not to scale) the conveyers 21 and 29 which carry the bobbins and rolled sheets vertically may operate at five times the speed of the conveyer 27 which carries the deployed sheets. In this case the spacing of the bobbins of conveyors 21 and 29 is five times the spacing of the bobbins of carrier 27.

In some circumstances, particularly where water temperature is very much lower at greater depths, it is desirable that the deployed sheets be moved upwardly rather than downwardly because the adsorptive capacity of hydrous titania decreases with decreasing temperature. Such a rearrangement is easily made and the result is that fresh adsorber sheets are deployed in the coldest water and the heavily loaded adsorber sheets are in the warmest water nearer the surface thus maximizing the efficiency of adsorption.

Figure 5:
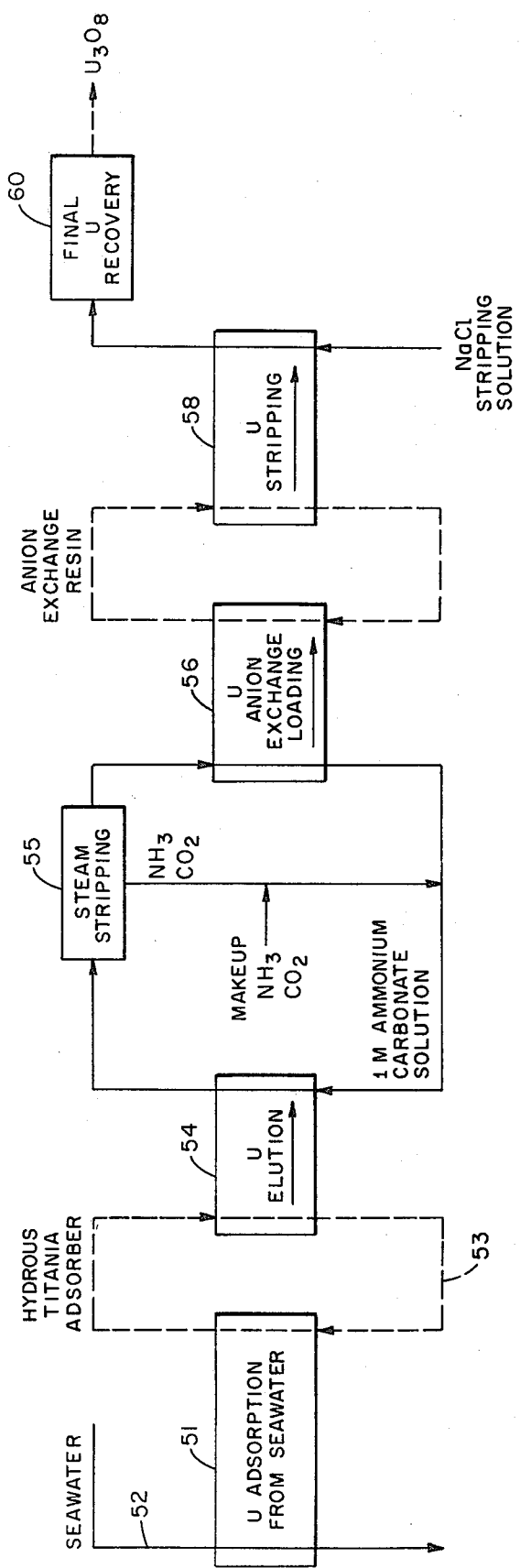
FIG. 5 is a process flow chart of the extraction.

In the process flow chart of FIG. 5, the adsorption station is shown at 51, a current of sea water flowing through the station as indicated at 52. The dashed loop 53 indicates adsorption by the hydrous titania elements at 51 followed by the countercurrent elution at 54.

The ammonium carbonate elutant loaded with uranium may be passed to a steam stripping station 55 where the ammonium carbonate is removed (as $NH_3$ and $CO_2$), the ammonium carbonate then preferably being recycled for further use. From the steam stripping station the uranium solution is passed to the loading station 56 where it is loaded with a suitable anion exchange resin of the type conventionally used in the recovery of uranium from leach liquors. Finally at a stripping station 58 a salt stripping solution is injected to provide an output of uranium in the form of $U_3O_8$ at the recovery point 60.

As previously noted, the full width of a typical adsorber sheet may be 240 feet and the length may be 200 feet. About 400 such sheets are used, 200 being deployed in the ocean currents while a second 200 sheets may be going through the elution process.

Figure 6:
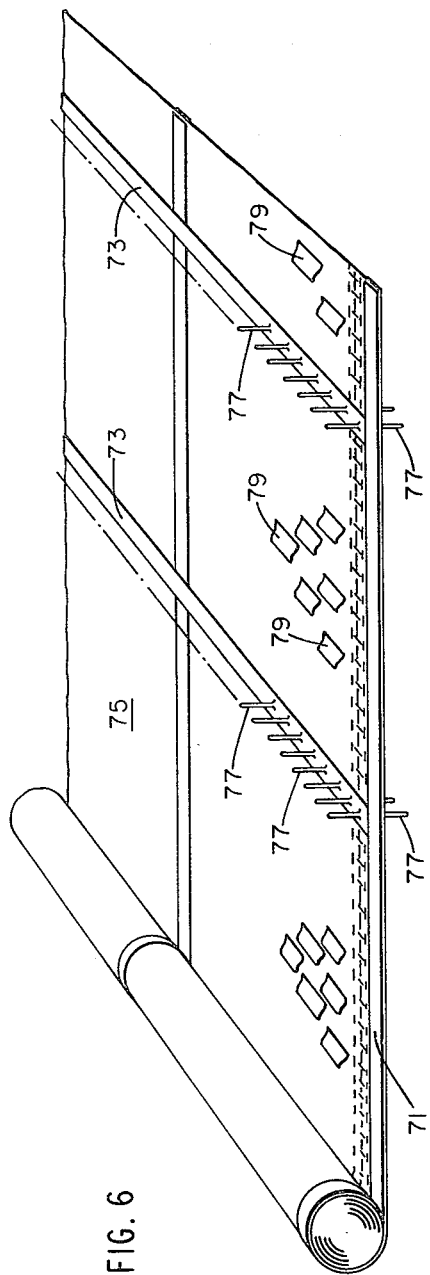
FIG. 6 is a view of a preferred form of adsorber sheet.
Figure 7:
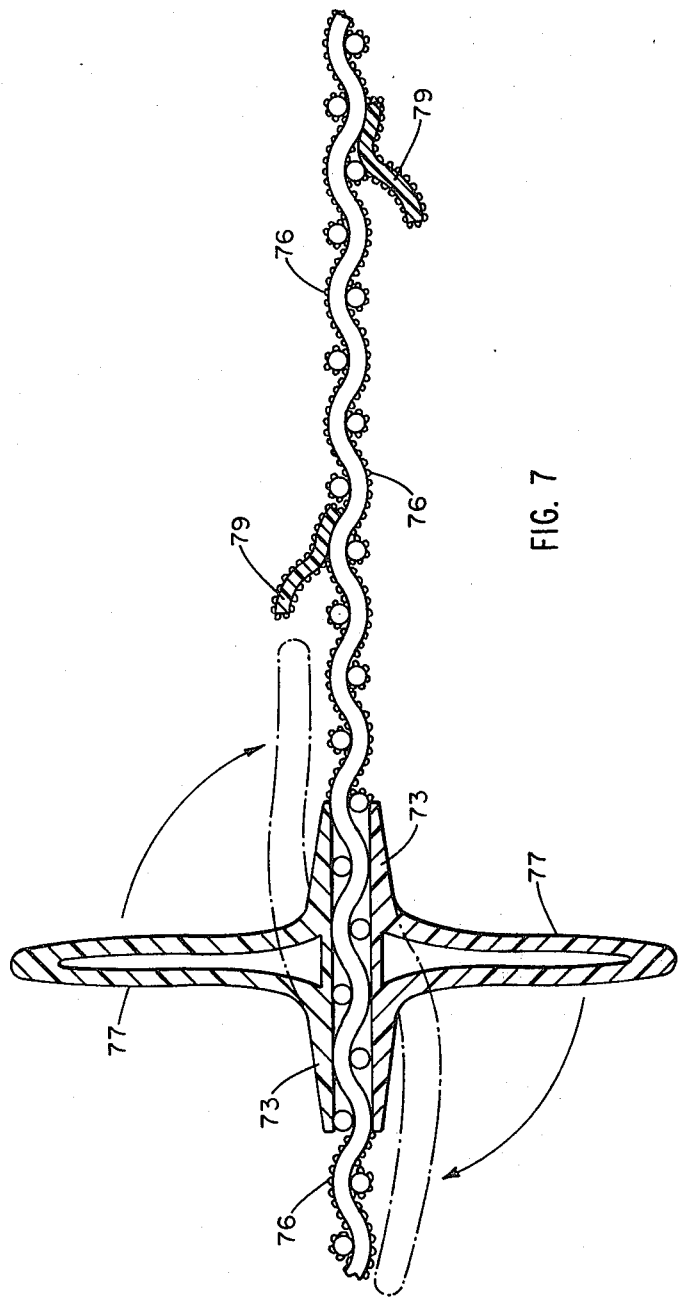
FIG. 7 is an enlarged cross-sectional view of a portion of the adsorber sheet shown in FIG. 6.

Some detail on a preferred form of adsorption sheets is shown in FIGS. 6 and 7. Preferably, the sheets comprise a loosely woven fabric or a screen to the surfaces of which micron-sized particles of a uranium-adsorbent material such as hydrous titanium oxide are attached. Hydrous titanium oxide has been shown to be particularly effective in selectively adsorbing uranium from sea water. Use of an adhesive in attaching the particles permits exposure for adsorption of all of the surfaces of the particles except for those in contact with the matrix fabric or sheet. The density of the sheet with its attached particles is adjusted to provide approximately neutral buoyancy in the sea water currents.

Each adsorber sheet segment may be made in the form of a grid of supporting tapes, an end tape 71 being doubled upon itself and laced to cross tapes such as the tape 73, all tapes being further laced to a mesh screen 75. The screen 75 may be a monolayer or two or more layers of mesh to the surfaces of which hydrous titania particles 76 are attached. The filaments of the mesh screen may be fluted to increase surface area and may be about 0.032 inch in diameter. The mesh may be square and the filaments spaced apart by a distance equal to their diameters. With such dimensions 25% of the screen area is open. The hydrous titania particles which coat the filaments of the screen are of a nominal size of about 20 microns.

The sheets with the adhered particles operate adequately, with good mass transfer rates. Mass transfer is aided in part by the tendency of the sheets to ripple in the current, creating turbulence. Mass transfer rate is also aided by the use of a screen rather than a solid, impermeable surface as a support for the adsorbent since the discontinuous surface of the screen serves to break up laminar boundary layers, which increases mass transfer rate.

Other modifications may be useful in increasing turbulence and mixing in the seawater flowing between adjacent sheets. For example, one system of enhancing turbulence illustrated in FIGS. 6 and 7 is the use of flexible self-erecting fingers 77 provided in spaced arrays along the cross-tapes of the grid of adsorber sheets. When the sheets are rewound after deployment, the fingers are flattened against the supporting sheet and serve as spacers to enhance the flow of elutant through the rolls.

In addition to the turbulence fingers, flow diverters 79 may be applied to the adsorber sheets. These diverters are in the form of curved, scoop-like barriers spaced and aligned in such a fashion as to divert seawater flowing between sheets and cause it to surge back and forth through an adsorber sheet.

Reverting to FIGS. 1 and 2, the top deck 18 of the platform may also include a service center 62 for operating personnel, laboratory facilities, and the like. Storage and maintenance quarters 64 may also be provided and hoisting equipment such as the cranes 66 and 68 may also be mounted on the deck 18.

Reference has been made throughout the disclosure to the bobbins which are used. Although cylindrical perforated bobbins may be used, it is also contemplated that perforated bobbins of a flattened shape such as an oval shape may be used. With the flattened bobbins, greater numbers may be carried on the conveyer 21 for travel from the conveyer 20 to the deployment motor 24 and on the conveyor 27, maximizing the number of sheets deployed in the adsorber bed. Finally, after the rolls are wound upon the bobbins at the point 28, the spacing on the conveyer 29 may be closer by use of the generally flattened shape.

Both the tape grid and the mesh screen of the adsorber sheets may be made of a suitable plastic such as polypropylene. The hydrous titania particles are generally of highly irregular shape and therefore provide an exposed surface area considerably greater than the nominal screen area. The particles may be attached to the screen by means of a waterproof elastomeric adhesive such as a solution of nitride rubber dissolved in methyl ethyl ketone. In such circumstances, it is important that the procedure for coating the adsorber sheets with adhesive and attaching the particles not result in coverage of an excessive fraction of the particle surface by the adhesive. The particle attachment procedure may, therefore, include careful monitoring of the viscosity of the coating of adhesive applied to the screen to ensure that the particles thereafter applied sink to only a specified percentage (e.g. 20 percent) of their volume into the adhesive. Another feasible method of attachment is by a spray of hot particles which become attached to the screen by reason of partial melting of the filaments which compose the screen. A screen of cellulose fibers (e.g. cotton) may also be used, in which case a latex adhesive such as a urethane latex would be used.

What has been disclosed constitutes a preferred embodiment of the invention. However, other alternative structures suitable for carrying out the invention will suggest themselves to those skilled in the art. The invention should be limited only by the spirit and scope of the appended claims.

What is claimed is:

1. A method of extracting uranium from sea water which utilizes adsorber sheets comprising the steps of deploying said sheets in a current of sea water, moving said deployed sheets through said sea water to adsorb uranium, winding said sheets on perforated hollow bobbins to form rolls, and eluting uranium from said wound sheets by passing elutant from inside said bobbins through said rolls.

2. A method as defined in claim 1 wherein said sheets are deployed substantially horizontally in said current and said deployed sheets are moved substantially vertically through said sea water.

3. A method as defined in claim 1 wherein said steps for extracting uranium from sea water are performed substantially continuously.

4. A method as defined in claim 1 further including, prior to said elution step, the steps of passing fresh water from inside said bobbins through said rolls to flush said rolls and rotating said rolls at high speed to centrifugally force fresh water and salt water from said bobbins and rolls.

5. A method as defined in claim 1 wherein said rolls are moved vertically to a first predetermined depth below the surface of the sea water before being deployed by unwinding, said deployed sheets are moved further vertically to a second predetermined depth below said surface, said deployed sheets are rewound into rolls at said second predetermined depth and said rolls are moved to a point above said surface for the elution of uranium therefrom.

6. A system for extracting a specific metal from sea water comprising means for deploying sheets having adsorbers of the specific metal associated therewith substantially horizontally in a current below the surface of sea water for a predetermined period, means for winding said sheets into rolls after said predetermined period, means for raising said rolls to a point above the surface of said sea water, means disposed at said point for eluting said metal from said rolls, and a platform structure for supporting said means for deploying said sheets at a first predetermined point below said surface, for supporting said means for winding said sheets into rolls at a second predetermined point below said surface, and for supporting said means for eluting said metal from said rolls at said point above said surface.

7. A system as defined in claim 6 wherein said platform structure includes at least a deck disposed at said point above said surface and legs fixed in place on the bottom below said surface supporting said deck, said deploying means and said winding means being disposed on said legs at said first and second predetermined points respectively and said eluting means being disposed on said deck at said point above said surface.

8. A system as defined in claim 6 and further comprising first conveyer means for moving said deployed sheets from said first predetermined point to said second predetermined point at relatively low speed and second conveyer means for moving said rolls from said second predetermined point to said first predetermined point at relatively high speed.

9. A system as defined in claim 8 wherein said means for eluting said metal comprises means disposed on said deck for introducing elutant into the interior of said rolls to pass outwardly through said rolls to elute said metal.

10. A system as defined in claim 9 and further including hollow perforated bobbins on which said rolls are wound and through which said elutant is passed from the inside thereof.

11. A system as defined in claim 10 wherein said bobbins are of flattened cross-section.

12. A system as defined in claim 10 and further including means disposed on said deck for engaging said bobbins to impart rotation thereto for centrifugally forcing liquids therethrough.

13. A method of continuously extracting a specific metal from sea water which utilizes adsorber sheets having adsorbers of the specific metal associated therewith comprising the steps of:
   moving rolls of said sheets to a first predetermined depth below the surface of the sea water;
   unwinding the sheets from said rolls to deploy said sheets substantially horizontally in a current of the sea water;
   moving the deployed sheets vertically through the sea water to a second predetermined depth;
   rewinding said sheets at said second predetermined depth to again form rolls;
   moving said rolls of rewound sheets to a point above the surface of the sea water; and
   eluting said specific metal from said sheets by passing elutant through said rolls of rewound sheets.

14. A method as defined in claim 13 wherein said rolls are formed by winding said sheets on perforated hollow bobbins, and said eluting step comprises passing said elutant from inside said bobbins through said rolls.

* * * * *